United States Patent
Hansen et al.

(10) Patent No.: US 6,658,143 B2
(45) Date of Patent: Dec. 2, 2003

(54) RAY-BASED IMAGE ANALYSIS FOR BIOLOGICAL SPECIMENS

(75) Inventors: Richard L. Hansen, Pennington, NJ (US); William J. Karsh, Plainsboro, NJ (US)

(73) Assignee: Amersham Biosciences Corp., Piscataway, NJ (US)

( * ) Notice: Subject to any disclaimer, the term of this patent is extended or adjusted under 35 U.S.C. 154(b) by 10 days.

(21) Appl. No.: 10/136,096

(22) Filed: Apr. 29, 2002

(65) Prior Publication Data

US 2003/0202689 A1 Oct. 30, 2003

(51) Int. Cl.⁷ .................................................. G06K 9/00
(52) U.S. Cl. ........................................ 382/133; 382/191
(58) Field of Search ................................. 382/128, 133, 382/134, 191, 197; 348/79, 80; 356/39

(56) References Cited

U.S. PATENT DOCUMENTS

| | | | |
|---|---|---|---|
| 5,267,328 A | * 11/1993 | Gouge | 382/16 |
| 5,915,036 A | 6/1999 | Grunkin et al. | 382/132 |
| 6,014,474 A | * 1/2000 | Takeo et al. | 382/308 |
| 2001/0024516 A1 | * 9/2001 | Yoshioka et al. | 382/128 |
| 2003/0059093 A1 | * 3/2003 | Rosania et al. | 382/128 |

OTHER PUBLICATIONS

Gundersen et al., "Stereological estimation of the volume–weighted mean volume of arbitrary particles observed on random sections," *Journal of Microscopy*, vol. 138, pp. 127–142 (May 1985).

Setarehdan et al., "Automatic Cardiac LV Boundary Detection and Tracking Using Hybrid Fuzzy Temporal and Fuzzy Multiscale Edge Detection," *IEEE Transactions on Biomedical Engineering*, vol. 46, No. 11 (Nov. 1999), pp 1364–1378.

Smit et al., "Star Length Distribution: a volume–based concept for the characterization of structural anisotropy," *Journal of Microscopy*, vol. 191, pp. 249–257 (Sep. 1998).

Young et al., "Characterization of Chromatin Distribution in Cell Nuclei," *Cytometry*, vol. 7, pp. 467–474 (1986).

* cited by examiner

*Primary Examiner*—Andrew W. Johns
(74) *Attorney, Agent, or Firm*—Fish & Neave; Kevin T. Roddy (57) ABSTRACT

Image acquisition and analysis systems and methods are provided. A ray-based approach may be used to process images for cell-based assays. Such cell-based assays may be used to evaluate drugs or other compounds or to perform other biological studies. A scanning laser microscope or other equipment may be used to gather image data from fluorescently-marked cells or other suitable specimens. The rays are radially-oriented with respect to the cell nuclei. Seed points within the nuclei may be identified. The rays may extend outward from the seed points or other suitable ray origins until the rays are terminated according to ray termination criteria. The intensity of the image data that is associated with each of the rays may be analyzed to generate various parameters. For example, a peak intensity of the image data along each ray may be identified. Statistical calculations may be performed.

33 Claims, 7 Drawing Sheets

RAY-BASED IMAGE ANALYSIS FOR BIOLOGICAL SPECIMENS

BACKGROUND OF THE INVENTION

This invention relates to image analysis, and, more particularly, ray-based image analysis for biological specimens.

The process of evaluating the effect of various compounds on biological specimens for drug screening and other research activities is generally labor intensive. In even a relatively modest cell-based assay, one may investigate hundreds or thousands of different combinations of compounds and concentrations. One approach for gathering and analyzing such large amounts of data involves using highly automated equipment to expose cell-based biological specimens to different conditions. Automated microscopy equipment and digital image processing software may be used to acquire digital images of each of the specimens and to evaluate the impact of the different conditions to which the specimens have been exposed.

It is an object of the present invention to provide improved systems and methods for evaluating images of biological specimens.

It is another object of the present invention to provide improved image processing arrangements that may be used in performing cell-based assays.

SUMMARY OF THE INVENTION

These and other objects of the invention are accomplished in accordance with the principles of the present invention by providing image processing equipment and methods suitable for evaluating images of biological specimens. A user of the system may perform cell-based assays for drug screening or general biological research. Cells may be cultured in a number of individual wells in microtiter plates or other suitable biological specimen mounting arrangements may be used. The cells in each well may be individually tested. For example, the cells in each well may be exposed to different biochemical agents such as peptides, enzymes, nucleic acids, or other suitable organic or inorganic compounds.

Digital images of the cells may be collected using automated equipment. The automated equipment may, for example, acquire an image corresponding to the cells in each microtiter well. If desired, the cells may be marked with fluorescent markers and images may be acquired using a single-wavelength or multi-wavelength scanning laser microscope and a digital image sensor. The images may also be acquired with other suitable microscopes (e.g., light microscopes) or other image acquisition equipment.

The digital images of the cells may be processed to determine the location of cell nuclei. A seed point within each nucleus may be identified. A set of radially-oriented rays may be associated with each cell nuclei. The rays associated with a given cell may have a common origin that is located at the seed point. If desired, the rays may each have a different origin. As an example, each ray may originate from a different location on the boundary of the nucleus. Each ray may extend radially outward from the cell interior towards the outer cell boundary until terminated at an outer endpoint.

The rays preferably do not extend beyond a predefined maximum extent and do not overlap with the nuclei of cells other than the cell from which the rays originate. A user of the system may adjust image acquisition and analysis parameters such as the ray termination criteria that specify how the system is to determine the outer endpoints of each ray. Suitable user-specified termination criteria include threshold-based criteria and maximum length criteria.

Once the locations of the rays corresponding to each seed point in an image have been determined, various ray-based image analysis steps may be performed using the image data that lies along the rays. For example, average pixel intensity levels may be determined along the rays or portions of the rays. Minimum and maximum pixel intensity levels, statistical intensity level distributions, and ratios of any of such values may also be determined.

When a multi-wavelength fluorescence microscope arrangement is used, images may be acquired using different data channels each of which corresponds to a different fluorescent marker color. For example, one data channel may be used to capture image data for a blue wavelength. Another data channel may be used to capture red data and yet another data channel may be used to capture green data. With this type of approach, the DNA in the cell nuclei may be marked with a blue marker (for example) that binds to DNA. The blue channel data may be processed to identify nuclei and seed point locations. A green marker (for example) may be used to label a protein of interest. When the cell is exposed to a test compound, the green-labeled protein may or may not translocate within the cell. As an example, the green-labeled protein might initially be located on the outer cell wall. After being exposed to a particular compound, the green-labeled protein may be redistributed throughout the cytoplasm of the cell. This movement of the green-labeled protein may be analyzed using the ray-based analysis approach.

Further features of the invention, its nature and various advantages will be more apparent from the accompanying drawings and the following detailed description.

DETAILED DESCRIPTION

Figure 1:
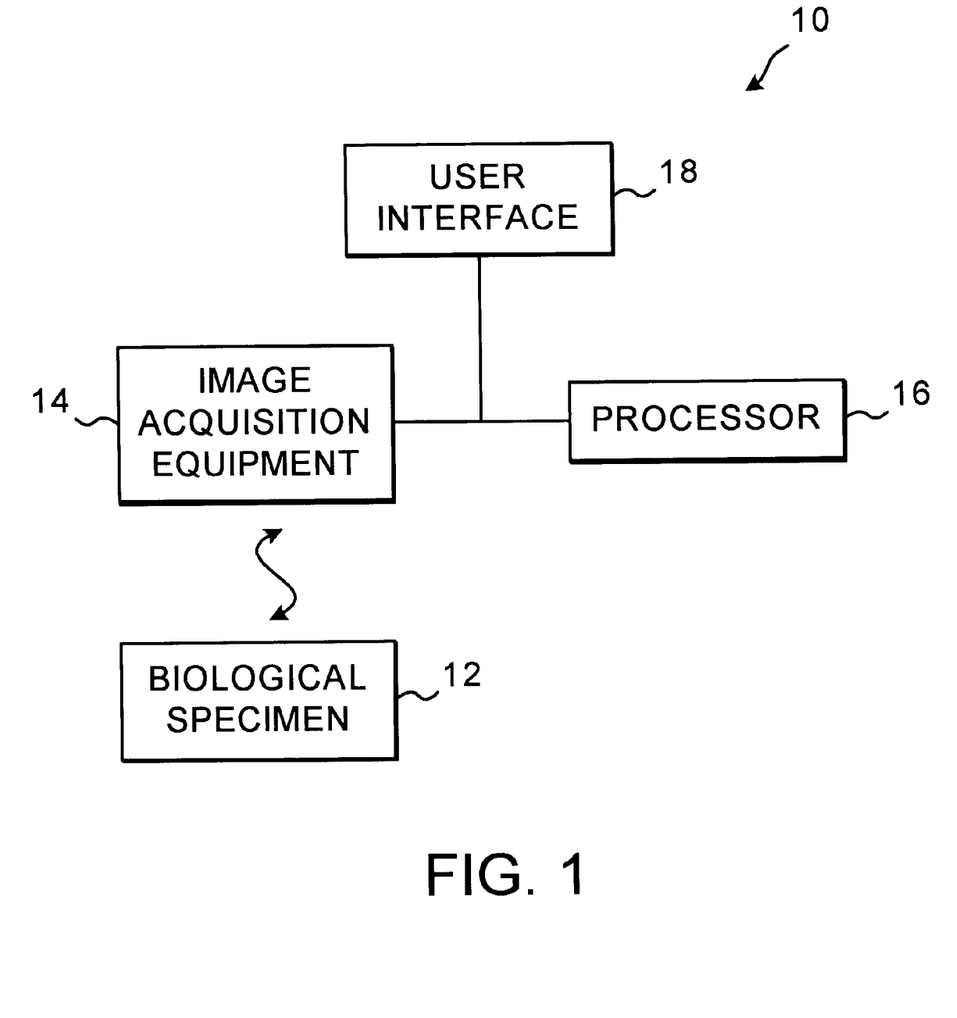
FIG. 1 is a schematic diagram of an illustrative system that may be used to acquire and process digital images of biological specimens for performing cell-based assays in accordance with the present invention.

An illustrative system 10 in accordance with the present invention is shown in FIG. 1. System 10 may be used to acquire and process images of biological specimens such as specimen 12. Specimen 12 may be any suitable biological specimen. As an example, specimen 12 may be a cell sample that is provided in the well of a multi-well microtiter plate. System 10 may include an automatic stage for positioning successive wells of the microtiter plate in the proper location for image acquisition. This is merely one illustrative arrangement. Any suitable arrangement for preparing and presenting biological images to system 10 may be used if desired.

Image acquisition equipment 14 may be used to acquire an image of specimen 12. Image acquisition equipment 14 may be, for example, a scanning laser microscope, a light microscope, or any other microscope or imaging equipment. Image acquisition equipment 14 is preferably capable of resolving cell structures so that system 10 may be used in performing cell-based assays.

The images that are acquired by image acquisition equipment 14 may be processed by a processor 16. A user may view image analysis results and may enter inputs to system 10 using a user interface 18. In one suitable arrangement, image acquisition equipment 14, processor 16, and user interface 18 may be part of a single microscope system. In another suitable arrangement, image acquisition equipment 14 may be based on a microscope system and processor 16 and user interface 18 may be part of a stand-alone computer or network of computers. Image acquisition system may be purely digital (using a digital sensor to capture image data) or may be a hybrid analog-digital system in which images are initially captured on a light sensitive media such as film and subsequently converted to digital image data using a scanner.

If desired, image acquisition and processing tasks may be divided across one or more platforms. For example, raw digital images may be acquired using a microscope and its internal processor may be used to handle these raw digital images. The images may be passed to an external computer or network of computers for subsequent image processing. One or more users at the microscope and computer may provide user inputs to adjust the image processing settings. Such user inputs may be provided using a user interface 18 such as a computer keyboard, mouse, etc. Images and other data may be displayed and printed for the user with a printer or other output device in user interface 18.

Figure 2:
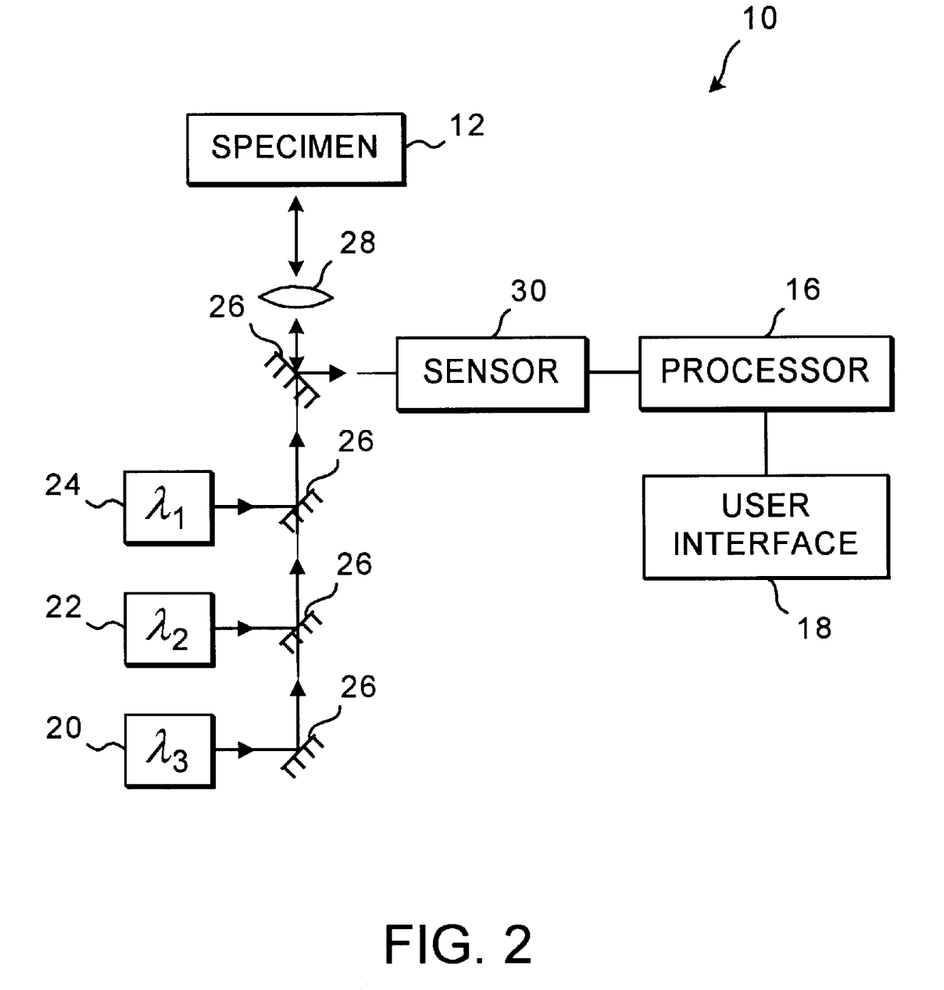
FIG. 2 is a schematic diagram of an illustrative scanning microscope system that may be used to acquire and process digital images of biological specimens for performing cell-based assays in accordance with the present invention.

An illustrative image acquisition and processing system that is based on a scanning laser microscope arrangement is shown as system 10 of FIG. 2. The microscope arrangement of FIG. 2 may have one or more light sources such as light sources 20, 22, and 24. These light sources may, for example, be lasers such as gas lasers. When multiple light sources are used, each light source may have a different associated wavelength. In the example of FIG. 2, there are three light sources having three associated wavelengths: $\lambda_1$, $\lambda_2$, and $\lambda_3$. These wavelengths may (as an example) correspond to wavelengths in the red, blue, and green portions of the visible light spectrum.

The light from sources 20, 22, and 24 may be collimated and scanned across the surface of a specimen using partially or fully reflective mirrors 26 and a lens or lenses 28. Scanning may be performed by, for example, moving one or more of mirrors 26, lens 28, or other suitable scanning optics. The scanned laser beam or other light from sources 20, 22, and 24 may be scanned across the surface of specimen 12 in a two-dimensional pattern. With another suitable approach specimen 12 may be mounted on a movable stage. The stage may be translated relative to a fixed laser beam. If desired, a combination of the scanned beam and scanned stage approaches may be used. These various approaches allow two-dimensional digital images of specimen 12 to be acquired.

If specimen 12 includes cells or other biological agents that have been labeled with fluorescent markers, the specimen 12 will fluoresce in response to illumination by the scanning light. For example, regions of the specimen that have been marked with a blue fluorescent marker will fluoresce at a blue wavelength. Regions of the specimen that have been labeled with red or green fluorescent markers will give off image light in the red or green portions of the spectrum.

The image light from specimen 12 may be digitized using a sensor 30. Sensor 30 may, for example, be a two-dimensional charge-coupled device (CCD) or complementary metal-oxide-semiconductor (CMOS) image sensor. Sensor 30 may also be a one-dimensional sensor (e.g., a photodetector). If a one-dimensional sensor is used, two-dimensional image data may be gathered using the known location of the scanning illuminating light on the specimen surface (i.e., using information on the beam location that is derived from the known location of a scanned beam, the known location of a translated stage holding the specimen, or both).

Color image information may be gathered using a color-sensitive detector. For example, a sensor that is sensitive at red, green, and blue wavelengths may be used to collect image data in the red, green, and blue channels. If desired, color information for different channels may be gathered using a number of sensors each of which has an associated optical bandpass filter that passes light of a different color. Color image information for different channels may also be gathered by recording information on which light sources are used during the image acquisition process. Data that are gathered when specimen 12 is illuminated by source 20 may be associated with a first channel, data that are gathered when specimen 12 is illuminated by source 22 may be associated with a second channel, and data that are gathered when specimen 12 is illuminated by source 24 may be associated with a third channel.

Although the microscope arrangement of FIG. 2 uses three laser-based light sources to provide illumination for specimen 12, this is merely illustrative. Any suitable light sources and image sensor arrangement may be used to illuminate and gather image data from specimen 12. Image data may be gathered using a monochromatic image acquisition scheme or image data may be gathered in any suitable number of channels (e.g. 2 channels, 3 channels, 4 channels, or more than 4 channels) each having a different associated wavelength.

Moreover, the optical arrangement of FIG. 2 is merely illustrative. A microscope may be used that is based on a transmissive arrangement (rather than a reflective arrangement as shown in FIG. 2) or a microscope that uses other arrangements for illuminating and gathering image sensor data may be used.

Processor 16 and user interface 18 may be, but need not be, integrated into the same equipment as the optical components. Processor 16 and user interface 18 may also be used in conjunction with a separate stand-alone computer or computer network. For example, the equipment of FIG. 2 may be used to gather multi-wavelength multi-channel two-dimensional image data that are further processed using equipment that is part of or external to the equipment of FIG. 2.

Specimen 12 may be any suitable biological specimen or, if applicable, a non-biological specimen. For clarity, the present description is focused primarily on the illustrative example of performing cell-based assays. In this context biological specimen 12 is typically a monolayer of cells grown on the bottom surface of a microtiter plate. The cells may be labeled with suitable stains or markers, so that different portions of the cell may be readily distinguished by the image acquisition equipment.

It is typically desirable when performing image analysis of cell samples to identify cell nuclei. Any suitable staining or marking process may be used to label cell nuclei. For example, a Hoechst 33342 stain may be used that binds to the DNA in the cell nuclei. This blue fluorescent marker may be imaged using the blue channel in system 10. The locations of the cell nuclei may be identified using any suitable image thresholding and filtering techniques. As an example, a user-specified or system-default threshold pixel intensity value in the blue channel may be used to identify which pixels are most likely associated with nuclei. Background noise may be reduced by discarding pixels that are not adjacent to sufficiently large clusters of pixels.

Figure 3:
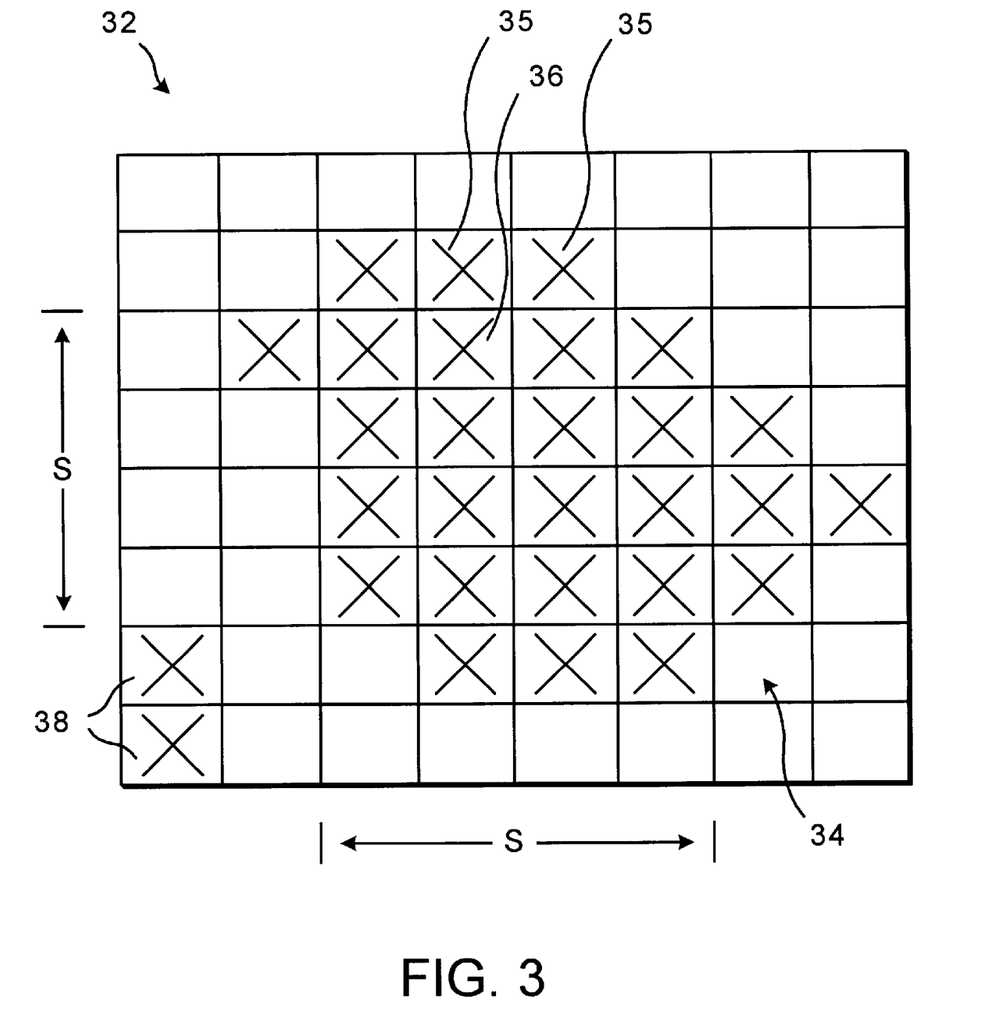
FIG. 3 is a pixel diagram of a portion of a digital image of a cell nucleus showing how a nucleus may be identified in accordance with the present invention.

An illustrative digital image 32 of a fluorescently-labeled cell nucleus is shown in FIG. 3. The image 32 of FIG. 3 corresponds to blue channel data after pixel intensity level thresholding has been applied, but before subsequent image filtering has been performed. As shown in FIG. 3, image 32 includes a main cluster of pixels 34. This cluster includes boundary pixels 35 and interior pixels 36. Also included in image 32 are outlying pixels 38, which are due to noise.

During a filtering and nucleus image recognition process, the cluster 34 may be identified as corresponding to a cell nucleus. As an example, cluster 34 may be identified as being a nucleus because the lateral dimensions of cluster 34 exceed user-specified or system-default pixel dimensions (shown as S in the example of FIG. 3). Cluster 34 may also be identified as being a nucleus by virtue of containing more than a user-specified or system-default number of adjacent or contiguous pixels. Pixels 38 may be rejected as noise, because they are neither adjacent to cluster 34 nor large enough to qualify as a nuclear cluster in their own right. Pixels that form clusters that are too large (e.g., because there are more than a user-specified or default number of adjacent pixels in a cluster or because the dimensions of a cluster are more than a user-specified or default size) may also be discarded during the filtering portion of the nuclei identification process. Such clusters are likely to correspond to strongly overlapping cells or cells in the process of dividing from which it may be difficult to obtain good data.

These are merely illustrative techniques for processing image data from image acquisition equipment 14 to identify cell nuclei. Any suitable image acquisition and image processing techniques may be used to identify nuclei if desired.

Once cell nuclei have been identified, the system 10 may determine appropriate seed point locations for each nuclei. The seed points may be used during the subsequent process of generating rays associated with each nucleus.

The seed points may be located near the center of the nuclear pixels. Any suitable technique may be used to determine suitable seed point locations based on pixel image data of the nuclei. For example, a suitable seed point may be chosen using a "pixel-location weighting" method. With this approach each pixel that is identified as being associated with a nucleus is assigned the same pixel intensity level, even though (as is typically the case) the pixels in the originally-acquired image may not all have had the same values. The locations of the resulting same-intensity pixels may then be averaged to determine a seed point location that is weighted based on the positions of the same-intensity pixels (and on their number). The seed point location that is selected using this technique will typically be near the visual center of the nucleus image.

A suitable seed point may also be chosen using a "pixel intensity weighting" method. With this approach, the intensity levels of the pixels are taken into account as well as the pixel locations. The seed point that is selected may be near to the center pixel chosen using the "pixel location weighting" method describe above, although the seed point selected using the "pixel intensity weighting" method will tend to be skewed towards the brightest (highest intensity) pixels.

These are merely illustrative techniques for determining where seed points associated with the nuclei should be located. Any suitable techniques may be used if desired.

After suitable seed points have been generated, a set of rays may be associated with each nucleus. The rays may radiate outward from the seed points toward the cell boundary, that is, the origin of the rays lie at the seed point. The rays may terminate at locations that are determined using suitable ray termination criteria. Once the rays have been defined, the image of the specimen may be analyzed by examining the data that lies along the rays for each set of rays. An advantage to using this type of ray-based image analysis arrangement is that it does not require that the image be definitively divided up into individual cells. It is not necessary to identify individual cell boundaries in the image to perform image analysis. This may considerably simplify the automated image processing tasks that are associated with performing cell-based assays, particularly when analyzing specimens that contain overlapping cells or that contain cell structures with cell boundaries that are difficult to identify.

Figure 4:
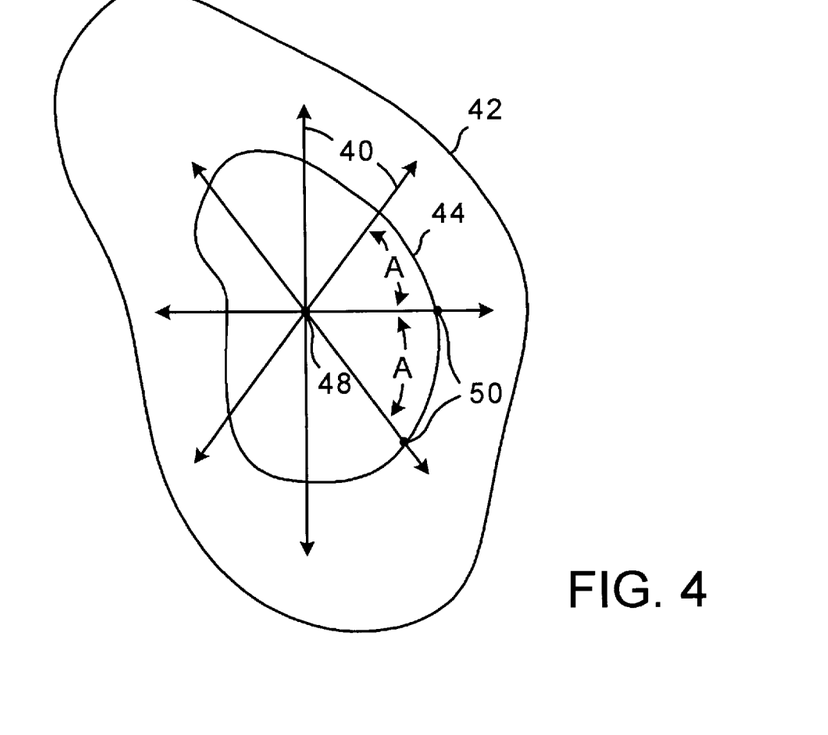
FIG. 4 is a diagram showing how rays at equally-spaced angles may be associated with a cell during image analysis in accordance with the present invention.

Rays may be associated with nuclei and the corresponding cells that contain the nuclei using any suitable approach. As an example, a user-specified or system-default number of rays may be associated with each cell and nucleus. This approach is illustrated in FIG. 4. As shown in the example of FIG. 4, eight rays 40 have been associated with cell 42 and nucleus 44. Although eight rays have been shown in FIG. 4, this is merely illustrative. Any suitable number of rays 40 may be used per cell and nucleus. For example, there may be only a single ray, 2 rays, 4 rays, 8 rays, 16 rays, 32 rays, or more than 32 rays per cell and nucleus. The rays 40 of FIG. 4 are evenly distributed around cell 42 and nucleus 44, so that each ray is separated from the next by the same angle A (45° in this example). If desired, non-uniform angular distributions may be used.

Figure 5:
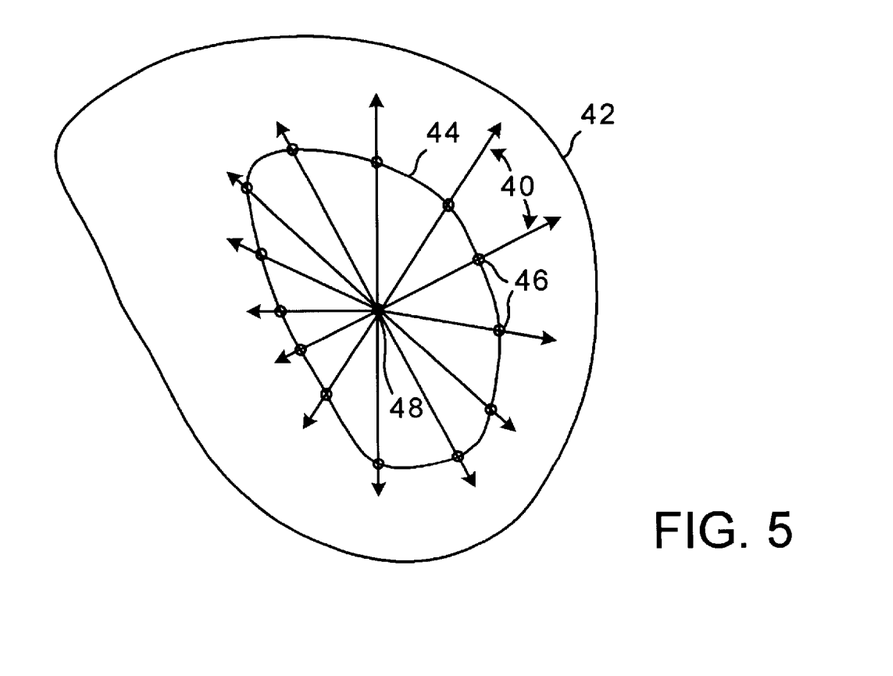
FIG. 5 is a diagram showing how rays may be associated with pixels on a cell boundary during image analysis in accordance with the present invention.

Another suitable approach for distributing the rays associated with a cell and nucleus is shown in FIG. 5. With the approach shown in FIG. 5, pixels 46 that are associated with the boundary of nucleus 44 are used to define ray locations. Each ray 44 may intersect a corresponding boundary pixel 46 that lies on or near the nucleus boundary. There may be a one-to-one correspondence between rays 44 and pixels 46 or a suitable ratio may be used. For example, there may be two or more (or a non-integer number) of rays associated with each pixel or there may be two or more (or a non-integer number) of pixels associated with each ray.

In the illustrative angle-based ray distribution method of FIG. 4 and the illustrative boundary-pixel-based ray distribution method of FIG. 5, rays 40 are shown as originating at seed point 48. This is merely illustrative. Any suitable locations (preferably within or near to nucleus 44 in cell 42) may be used for ray origins. For example, the origin of each ray 40 may be at the intersection points 50 of FIG. 4 or may lie on the boundary of the nucleus (e.g., at pixels 46 of FIG. 5). In these situations, the rays may have the same radial orientations as the rays shown in FIGS. 4 and 5.

It may be desirable to label parts of cells 44 other than the nuclei with fluorescent markers that fluoresce at different wavelengths or colors than the marker used to label the nuclei. Any suitable fluorescent markers and marking techniques may be used. For example, the well-known propidium iodide marker may be used as a fluorescent red marker. A labeled protein (e.g., a green-fluorescing protein construct such as a fusion protein of green-fluorescent protein and phospholipase-C—"GFP-PLC") may be used as a marker. Fluorescently-labeled antibodies may be used that bind to proteins of interest.

The cells used in cell-based assays are typically based on engineered cells lines. The cells in such cell lines may, for example, be immortalized so that they may be readily maintained in a cell culture environment. Such cells may also be modified to facilitate labeling. As an example, a cell line may be modified so that the cells include a particular protein that may be readily labeled with a marker.

Various studies may be performed using labeled cells. The studies may be used to examine movement of cell components and cell morphology. As an example, the localization of a labeled moiety around the cell nucleus may be studied. The movement of a fusion protein that has been released from the cell membrane into the cytoplasm of the cell in response to a stimulus may be studied. Similarly, the movement of the labeled moiety from the cytoplasm to the cell membrane may be studied. In general, the ray-based approach may be used to observe any desired redistribution or localization of a labeled moiety. As another example, the localization or release of fluor from mitochondria, which are often located in the perinuclear region may be observed. An advantage of the ray-based approach is that a specific organelle marker is not required to perform the analysis.

Another type of study that may be performed involves experiments that investigate the relationships between the rays associated with a nucleus to determine cell shape. As an example, an assay may be performed that investigates cellular adhesion. With such an assay, cells that are unbound and that therefore tend to exhibit a spherical shape with short rays 40 of nearly identical length can be distinguished from cells that are adhering to the bottom of the sample plate and therefore have longer rays and exhibit a wider distribution of associated ray lengths.

These are merely illustrative examples of the types of studies that may be performed using the ray-based approach. Any suitable cell assays or studies may be performed using the ray-based approach if desired.

Figure 6:
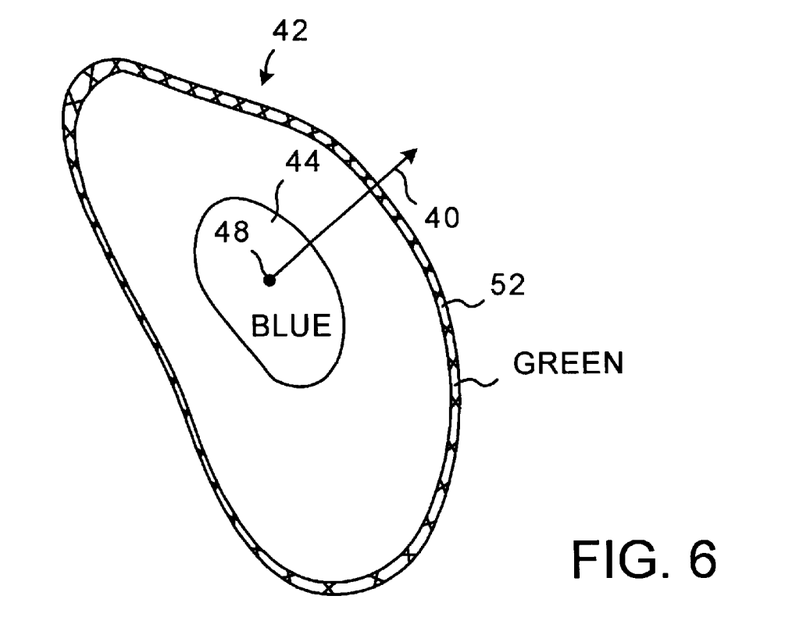
FIG. 6 is a diagram of a cell having illustrative blue and green fluorescent markers and an associated ray for use in image analysis prior to exposure to a test compound in accordance with the present invention.
Figure 7:
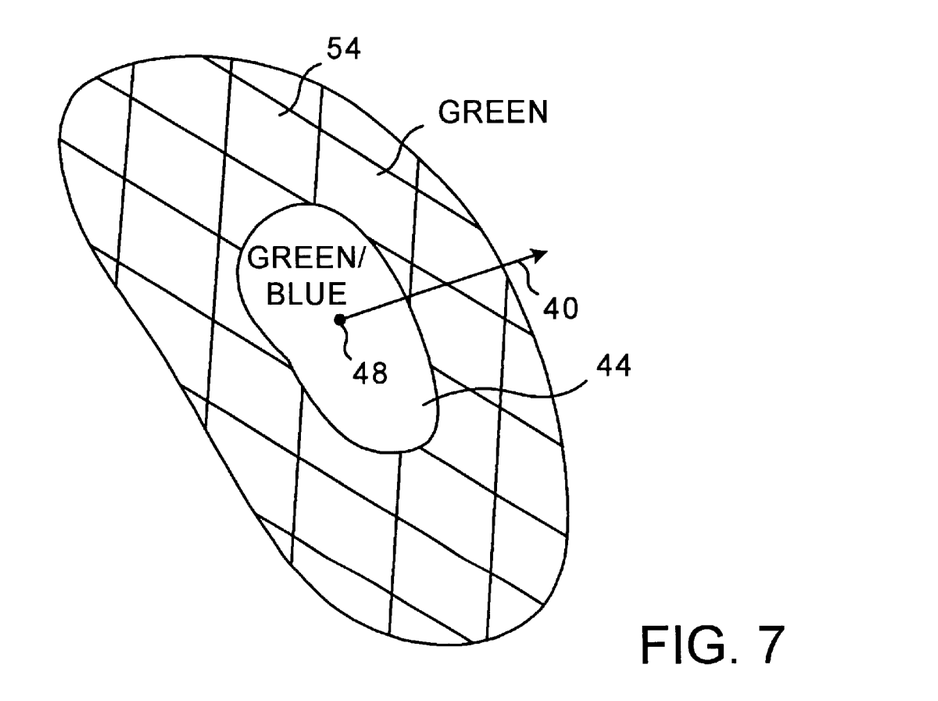
FIG. 7 is a diagram of the cell of FIG. 6 following exposure to the test compound in accordance with the present invention.

An illustrative example of a study that may be performed using the ray-based analysis arrangements of the present invention is shown in FIGS. 6–9. In this example, the cell nucleus has been labeled with a blue fluorescent marker. A protein of interest has been labeled with a green fluorescent marker. Initially, as shown in FIG. 6, the green marker is located primarily on the cell membrane 52 (also sometimes called the cell wall or cell boundary). After exposure to a test compound (e.g., ATP or other cell stimulant in this example), the protein associated with the green marker migrates into the cell body 54 (also sometimes referred to as the cytoplasm), as shown in FIG. 7. (There is a thin layer of cytoplasm surrounding the nucleus 44, so a small green signal may be detected even in the region of the nucleus 44 of FIG. 7.)

Figure 8:
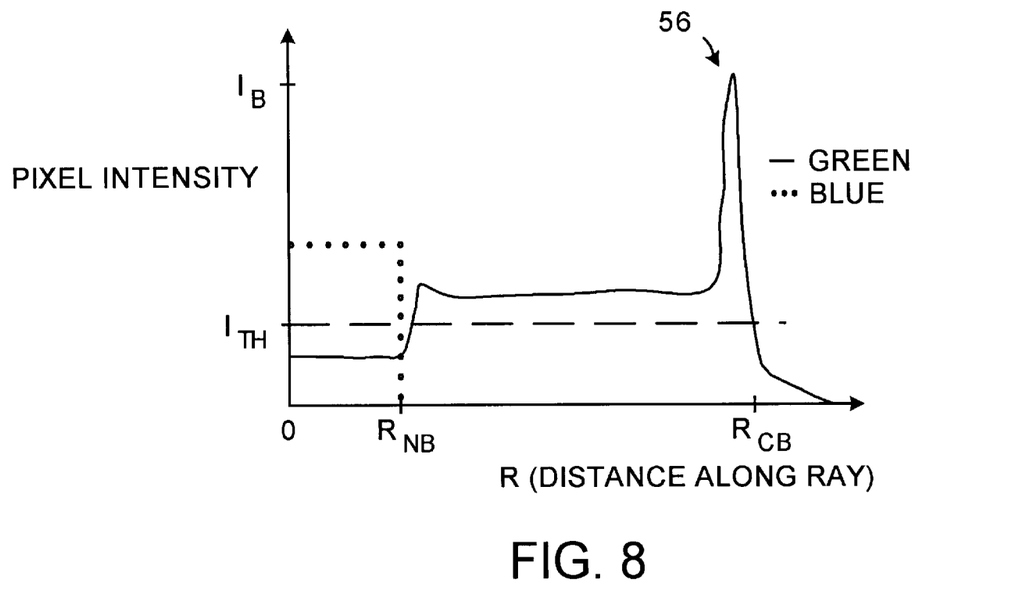
FIG. 8 is an image data intensity versus distance diagram taken along the ray of FIG. 6 in accordance with the present invention.
Figure 9:
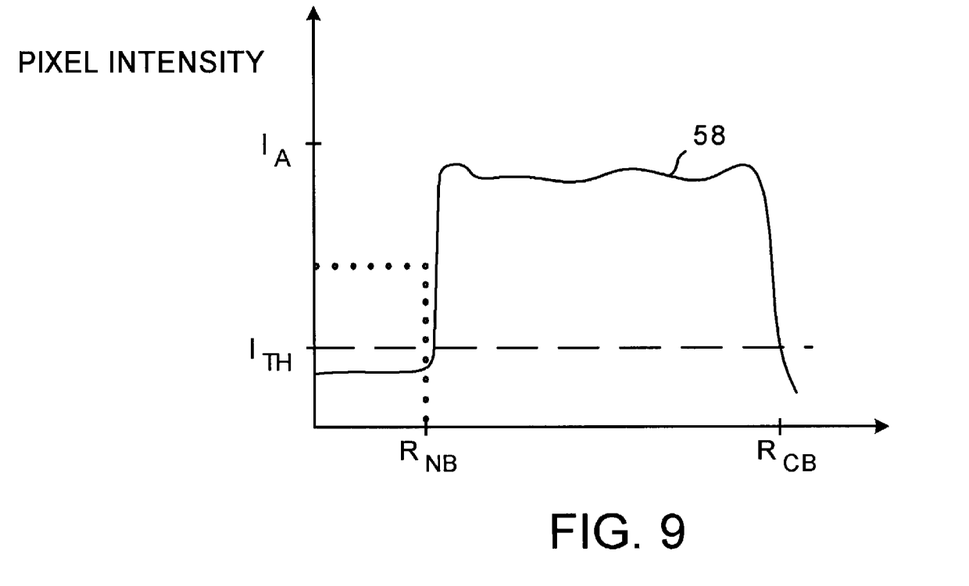
FIG. 9 is an image data intensity versus distance diagram taken along the ray of FIG. 7 in accordance with the present invention.

A graph of pixel intensity level data corresponding to pixels located along ray 40 of FIG. 6 is shown in FIG. 8. A graph of pixel intensity level data corresponding to pixels located along ray 40 of FIG. 7 is shown in FIG. 9. In each of these graphs, the blue channel image data are shown by a dotted line and the green channel image data are shown by a solid line. Pixel intensity level (as measured using, for example, a 12-bit digitization scheme) is plotted as a function of radial distance from the seed point 48 in the nucleus 44. The intensity level information for each ray may be extracted from the two-dimensional images captured by the image acquisition equipment 14.

By gathering image intensity data as a function of the distance along each ray 40 that is associated with a cell and nucleus (and corresponding seed point), data may be gathered that corresponds to a number of graphs of the type shown in FIGS. 8 and 9. This data may then be collectively analyzed to produce results including averages and statistical information for the set of rays associated with each cell and for the rays in each collection of cells in a particular sample.

In the example of FIGS. 6–9, the origin of rays 40 (R=0) is taken as being the same as the seed point location. This is merely illustrative. The seed point location and the ray origins may differ. For example, the ray origins need not all be located at the same point, but may be located on the boundaries of the nuclei (e.g., as points 46 of FIG. 5 or points 50 of FIG. 4). The radial orientation of the rays may be the same, regardless of where the ray origins are placed.

As shown in FIGS. 8 and 9, the intensity of the blue signal drops off at the nuclear boundary. The nuclear boundary is located a distance $R_{NB}$ from the seed point located at R=0. The ray origin may be located at R=0 or at $R_{NB}$ as determined from the blue channel signal or may be located at any other suitable point.

The graph of FIG. 8 corresponds to the situation of FIG. 6 in which the green marker is concentrated at the cell boundary. This results in a strong peak intensity level on the green channel, as shown by the intensity $I_B$ of peak 56 in FIG. 8.

Rays 40 should be terminated at or near the cell boundary so that the data associated with the cells is pertinent to those cells. A user-specified or system-default intensity threshold value $I_{TH}$ may be used as a ray termination criteria. When the measured intensity level of the image data associated with the ray drops below $I_{TH}$, the ray may be terminated. As shown in FIG. 8, the ray termination point may be denoted $R_{CB}$, because this point is associated with the cell boundary.

The same threshold-based ray termination scheme may be used to determine the cell boundary location after the cell has been exposed to test conditions, as shown in FIG. 9. The image data under analysis in FIGS. 6–9 is in the green channel. The blue channel data is used to locate the nucleus and seed point. If desired, a threshold-based arrangement may be used in the blue channel to determine the location of the nucleus boundary at $R_{NB}$.

If desired, a number of different ray termination criteria may be used to decide when to terminate rays 40. For example, rays may be terminated whenever the image intensity along a ray falls below a user-specified or default intensity level threshold, as described above. Rays may also be terminated whenever the ray length (e.g., measured from the ray origin) exceeds a user-specified or system-default length. Rays may also be terminated whenever it is determined that extending the ray further would cause the ray to encroach on another marked featured (e.g., another cell or nucleus). Any combination of these ray termination criteria or one or all of such ray termination criteria may be used to terminate rays 40 during image analysis. For example, the cell body threshold $I_{TH}$ may be set to zero and a ray length that corresponds to the longest portion of an average cell may be used to set a maximum ray length. This criteria may be used in combination with a criteria that specifies that the ray will terminate when another marked feature is encountered.

In the example of FIGS. 6–9, after the cell has been exposed to test conditions, the green marker that was originally located at the cell boundary (FIGS. 6 and 8) becomes evenly distributed throughout the cytoplasm, as shown in FIGS. 7 and 9. Because there is a thin layer of cytoplasm at the same radial location as nucleus 44, there is a small green channel image data signal between R=0 and R=$R_{NB}$, as shown most clearly in the graph of FIG. 9. The green channel signal between 0 and $R_{NB}$ may be discarded if desired (e.g., by using a ray-based approach with ray origins located on the nuclear boundary). The graph of FIG. 9 also shows how the peak 56 of FIG. 8 has been transformed into the uniform region 58 of FIG. 9, which has an intensity value $I_A$ that is somewhat lower than intensity $I_B$ of FIG. 8. By comparing the ray image data of FIG. 8 to the ray image data of FIG. 9, it can be determined that the green marker has moved from the cell boundary (FIG. 8) to the cytoplasm (FIG. 9).

The ability to measure and analyze image data on multiple channels may be advantageous when the marker for a particular channel moves or redistributes extensively during a study. For example, a green marker associated with a particular protein may initially be associated with the cell membrane (cell boundary). During a study, the green marker may redistribute throughout the cell. Because the green marker has redistributed, it may be difficult to extract useful information on the location of the cell boundary from the image of the redistributed green marker. However, if a red marker is used to label the cell membrane and if this red marker is not moving during the study, the red marker may be used as a point of reference when acquiring and analyzing green channel data.

As an example, consider the situation in which a red marker is used to label the cell membrane and a green marker is used to label a portion of a cell that is of interest in a given study. The main data channel calculations may be performed on the image data acquired in the green channel. However, the red channel data may be used to gather information that is used during the green channel processing activities. For example, the location along the rays of the peak intensity pixel (or pixels) in the red channel may be used to determine the location of the cell membrane. The peak intensity of a group of pixels along the ray may also be used to reduce the influence of anomalously bright pixels along the ray. For example, several pixels (1, 2, 5, 10 or other suitable number) along the ray, orthogonal to the ray propagation direction, or in the vicinity of the ray may be averaged to identify the location along the ray with the peak intensity. The location of the red marker peak intensity is a good indicator of cell membrane location, because the red marker does not move during the study of this example.

The location information derived from determining peak intensity in the red channel along a ray may then be used to identify which data are of interest in the green channel. As an example, the pixel location of the peak red pixels may be used when determining which green channel pixel information is to be gathered and analyzed (e.g., averaged, used in calculating ratios, etc.). Green channel data calculations that may be performed at identified red channel peak intensity locations include determining the ratio of intensities at the identified peak intensity locations to average ray pixel intensities and determining the ratio of intensities at the identified peak intensity locations to ray origin pixel intensities, etc. These calculations may be performed at the exact pixel location specified by the red peak data or in the vicinity of the red peak pixel location. Pixels in the vicinity of the red peak pixel may include those pixels in a region just surrounding the exact peak pixel location (e.g., at the exact pixel location +/−0%, 1%, 1%–5% or any other suitable fraction of the total ray length).

Even if the red channel data is used to assist in the processing of the data in the green channel, the green channel image data may be used to determine the location and extent of biological features in the specimen. For example, even if the red channel data is used to locate the cell membrane, green channel data (in the same green channel as the main data channel or in a green channel corresponding to a different green wavelength) may be used to produce information on the cell body. As an example, this additional green channel data may be compared to a threshold and the results of this comparison (whether pixel intensities are above or below the threshold) may be used to provide information on the location of the cell boundary (e.g., the location at which the threshold level is no longer exceeded).

Moreover, all three of these data capture channels (red, green 1, and green 2 or other suitable colors or wavelengths) may be used in conjunction with data for another channel (e.g., a blue channel or a channel associated with another suitable color or wavelength) that is used for other purposes (e.g., to locate the cell nucleus and seed point).

The image data that are acquired for various channels at different wavelengths may be used in other ways to determine which nuclei should be analyzed with the ray-based approach. For example, if a cell line expresses or can be labeled with a fluorescent marker to indicate the amount of a certain protein of interest contained in the cell, then only those cells that express (or alternatively do not express) a sufficient quantity of the protein may be analyzed. For example, the cell nuclei may be labeled and identified in the blue channel if a blue nuclear marker is used. If the protein to be measured for expression is labeled (or altered to fluoresce) at the green wavelength, then the pixels in the green channel in the vicinity of the nuclear pixels as identified in the blue channel may be examined for intensity. Only those cells with sufficient intensity in the green channel, indicating that there was sufficient expression of the protein of interest, would be analyzed with the ray-based approach. In this example, it may be possible to include a red membrane marker such that, as previously discussed, the peak intensity pixel (or pixels) along the ray in the red channel may be identified and used for analysis.

The average intensity of the pixels in the vicinity of the nucleus or along the rays in a color channel may also be used to normalize the peak intensity value calculated for a separate data channel. For example, the expression of a protein of interest may be monitored in the green channel and an assay may be designed to monitor the activation of a small fraction of the protein from within the cell to the cell surface where it can be labeled with a red marker. (In general, any suitable chemical or biological entity may be used to activate a specimen such as a chemical compound or a biological agent. Changes in the image data that are due to the activation may be studied by processing the image data.) In this example, the peak intensity of the rays in the red channel will correspond to the location of the (activated) labeled protein at the cell surface and the peak intensity in the red channel will be proportional to the amount of activated protein. In this case, it may be advantageous to normalize the red peak intensity to the green (expression) signal. In the absence of normalization it may not be possible to distinguish strongly activated cells with weak expression and weakly activated cells with strong expression; each may have an identical number of copies of the red-labeled protein of interest on the cell surface. The normalization of the red channel image data to match the green channel (using the results of green channel image data pixel intensity calculations) may be facilitated by the use of the blue channel image data to identify the locations of the cell nuclei.

An additional sort criterion for calculation of ray parameters in the ray-based approach is based on determining the number of valid rays drawn for a nucleus. There are several ray-termination criteria such as encountering either the nucleus of an adjacent cell or pixels along the ray that are lower in intensity than a user defined threshold value. The user may specify the number of pixels in a ray (i.e., the length in pixels of the ray from the origin to termination point) required for a ray to be qualified as a valid ray. The user may also specify the number of qualified rays a cell must have in order for ray parameters to be calculated from the individual ray data.

Figure 10:
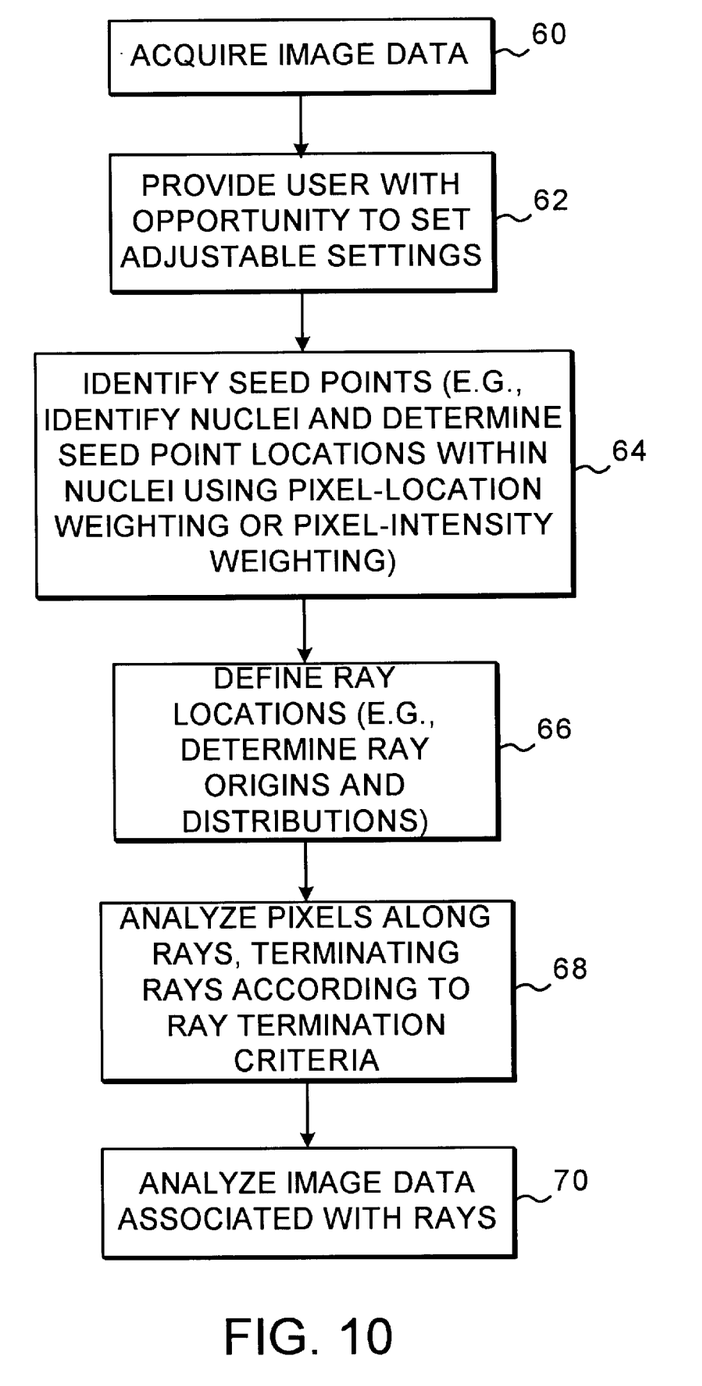
FIG. 10 is a flow chart of illustrative steps involved in acquiring and processing digital images of biological specimens such as specimens including cells in accordance with the present invention.

Illustrative steps involved in the ray-based image analysis approach are shown in FIG. 10. Initially, a marking scheme should be selected that is appropriate for the desired cell-based assay to be performed. Any suitable number of markers and associated image channels may be used. As an example, one marker (e.g., a blue marker) may be used to label cell nuclei. Another marker (e.g., a green marker) may be used to identify cell bodies. Another marker (e.g., a red or green marker) may fluoresce in a channel in which it is desired to locate a peak intensity such as peak intensity 56 of FIG. 8. Yet another marker (e.g., a green marker) may be used that corresponds to the channel in which the main data analysis is being performed (e.g., to monitor the movement of a labeled protein). These markers may each fluoresce at a different wavelength (color) or all or some may fluoresce at the same wavelength (color). Markers may also be used that do not fluoresce, so long as these markers may be detected (e.g., by visible light microscopy) using image acquisition equipment 14.

Once the type of study that is to be performed has been determined and a suitable marking scheme has been implemented, system 10 may be used to acquire image data for the biological specimen under test at step 60. This image acquisition step and the other steps of FIG. 10 may be repeated before and after the biological specimen has been subjected to various test conditions (e.g., exposure to an experimental compound). Images may be acquired using a multi-wavelength scanning laser microscope as described in connection with FIG. 2 or any other suitable image acquisition scheme may be used.

At step 62, system 10 may be used to provide one or more users with an opportunity to enter user-selected parameters. For example, a computer monitor may be used to present the user with selectable menu options and input boxes to be filled with suitable criteria and numbers. This approach or any other suitable approach may be used to collect user inputs. Steps such as steps 62 and 64 and other steps in FIG. 10 may be performed in different orders or concurrently if desired.

At step 64, system 10 may identify seed points to use in constructing sets of rays 40. The seed points may be identified using any suitable image processing technique. As an example, nuclei may be identified using suitable thresholding and filtering techniques (such as those described in connection with FIG. 3). The pixel-location-weighting or pixel-intensity-weighting techniques described in connection with FIG. 3 or other suitable seed point location techniques may be used to specify seed point locations within each of the identified nuclei.

At step 66, the locations of rays 40 may be established. Any suitable techniques may be used to determine the locations of rays 40. For example, the rays 40 that are associated with each cell and nucleus may have their origins at a single seed point located within that cell's nucleus. The rays 40 may also be assigned origins on the nucleus boundary.

The number of rays may be a system default or may be specified by the user (e.g., at step 62). The approach used to distribute rays around the nucleus may also be specified by the user or may be a system default. Rays may be distributed around the nucleus using an even-angle distribution approach as described in connection with FIG. 4. Rays may also be distributed around the nucleus according to the locations of the pixels associated with the boundary of the nucleus as described in connection with FIG. 5.

At step 68, the ray definition process may be completed by analyzing image data along the rays while extending the rays outward from their origins. The rays may be extended until they are terminated according to user-specified or system-default ray termination criteria. Suitable ray termination criteria that may be used include a user-specified or system-default maximum length or a user-specified intensity level threshold that (when not met by pixel intensities in the ray) indicates that the cell boundary has been reached. Rays may also be terminated whenever it is determined that extending the rays further would cause them to encroach on adjacent marked features (e.g., other nuclei or cells).

At step 70, the image data that was acquired at step 60 may be further analyzed using the established ray locations. All of the pixels or image data associated with each ray (in one or more of the data channels) may be processed. In one illustrative arrangement, one channel (e.g., the blue channel) may be used in identifying the locations of the nuclei (e.g., to establish seed point locations and ray origins). Another channel (e.g., the green channel) may be used to measure cell body features. A red channel (as an example) may be used to perform peak intensity measurements (e.g., measurements of the absolute peak intensity associated with a ray or average peak intensity just around a peak). Another channel (e.g., a second green channel) may be used to perform measurements of translocating cell features or other areas of interest. This channel may sometimes be referred to as the "main data channel." The markers for these different measurements may all have different wavelengths or some or all of these markers may share the same wavelength.

The data analysis performed by system 10 at step 70 may be used to calculate values for any suitable parameters that tend to provide information of use in ascertaining the results of the cell-based assay. As an example, a parameter IPEAK may be calculated by calculating the absolute peak intensity (e.g., in the main data channel or in a special peak intensity channel) for each ray. This peak intensity (labeled $I_B$ in FIG. 8) may be of interest in a study in which particular cell boundary activities are being investigated. For example, such a study may involve determining how many copies of a protein are "protruding" from a cell membrane (and are therefore successfully marked with the relevant marker) at a particular stage of the study.

Sometimes the intensity in the main data channel (e.g., the green channel) may exhibit an intensity peak at a certain ray location during one portion of a study and may not exhibit an intensity peak at that location during another portion of the study. For example, during some portion of a study, the peak intensity for each ray in a green main data channel may be located where the rays cross the cell membrane. During other portions of the study, the green markers may move. In this situation, the location along each ray in which the red (cell membrane marker) channel is at its peak may be used to provide information on the location of the cell membrane and this information may, in turn, be used to define a suitable location at which to measure the green channel data. The locations of the peak-intensity pixels (e.g., the location along each ray in which the red channel is at an intensity peak) may be used in identifying green pixels of interest at the cell boundary.

Another parameter that may be calculated at step 70 is a parameter RPKTL, which represents the ratio of the average peak value to the pixel intensity at the ray origin. The average peak value may be calculated by averaging pixels just before and after and including the peak pixel on the ray—i.e., by averaging all pixels +/−0, 1, 2, 5, 10 or any other suitable number of pixels that surround the peak value pixel. The pixel intensity at the ray origin may be the pixel intensity at the seed point or other suitable ray origin such as a nuclear boundary ray origin. The parameter RPKTL may serve as a normalized version of the IPEAK parameter. The average peak value may be measured in the main data channel (e.g., the green data channel) based on a peak pixel location in the green channel or based on a peak pixel location measured in another channel (e.g., in a special peak channel such as the red channel).

Another parameter that may be calculated is a RPKLN parameter. For this parameter, the average peak value (measured, e.g., in the main data channel based on peak intensity location data in the main data channel such as the green channel or a special peak intensity channel such as the red channel) may be compared to the average pixel intensity for all pixels on the ray (the average ray pixel intensity). The average pixel intensity for the pixels on the ray may be calculated by determining the average intensity of pixels along the ray between the ray origin (a seed point origin, cell boundary origin, or any other suitable location) to just before the peak location (as an example). If the peak pixel intensity location is located at pixel n, points that are "just before" the peak intensity may be located, for example, at pixels n−1 to n−100 (i.e., 1 to 100 pixels closer toward the ray origin along the ray) or at any other suitable location.

The average distance to the peak (e.g., the average distance along each of the rays 40 that are associated with a nucleus to the peak) may be calculated to produce a parameter DPEAK. The DPEAK parameter may be measured starting at the ray origin or (if desired) at the seed point, even if the seed point is not used as the ray origin for purposes of data analysis in the main data channel. The value of the parameter DPEAK may be indicative of cellular size (when the relevant peak marker is located on the cell boundary) or may be used to determine the distance a particular protein or cellular component has moved.

Statistical information may also be generated at step 70. For example, a parameter SDDPEAK may be generated that represents the average standard deviation of the ray distance to the peak pixel intensity value for each ray in the set of rays associated with a given nucleus. Accordingly, SDDPEAK may be a good indicator of cell morphology. Cells that are round may have a low standard deviation of ray lengths, whereas cells that are not round may have a high standard deviation of ray lengths.

Another parameter that may be calculated at step 70 is a parameter DWGHT (a normalized radius parameter). The parameter DWGHT may be calculated by determining the average intensity-weighted distribution of the pixels on the rays. The value of DWGHT may range from a value of 0 (when all of the pixel intensity for a cell is located at the seed point or other ray origins) to a value of 1 (when all of the pixel intensity is located at the outer ends of the rays). When the intensity-weighted distribution of the pixels is weighted more toward the ray origins than the outer ends of the rays, the value of DWGHT is nearer to 0 than to 1. When the intensity-weighted distribution of the pixels is weighted more toward the outer ends of the rays than the ray origins, the value of DWGHT is nearer to 1 than to 0. A perfectly even distribution of pixel intensities along the rays would result in a value of DWGHT equal to 0.5. The DWGHT parameter is good indicator of radial marker location (near the nucleus or near the cell boundary) and is not dependent on cell size or shape.

These parameters are merely illustrative. Any suitable statistical parameters or other ray-based parameters may be calculated at step 70 using the ray-based approach. Moreover, the image data that are analyzed may be organized in various ways during the calculations of step 70. For example, when average cell sizes are being calculated, the resulting calculated parameters may reveal the length of each ray, the average length of the set of rays associated with a given cell, nucleus, and seed point, the average length of all rays in a given specimen image, etc.

The measurements and calculations of FIG. 10 may be repeated one or more times during the course of a study (e.g., to evaluate how the cells in a cell-based assay behave when subjected to test conditions such as exposure to test compounds). Because it is typically not critical that entire cells and cell boundaries be individually identified in the captured image data, the ray-based approach described above may be considerably more robust than schemes that require complete cell identification to make image measurements.

It will be understood that the foregoing is only illustrative of the principles of the invention and that various modifications can be made by those skilled in the art without departing from the scope and spirit of the invention. Many examples of such modifications have been given through the foregoing specification.

The invention claimed is:

1. A method for analyzing digital image data for a specimen that contains cells, wherein the cells contain nuclei, comprising:

analyzing the image data to identify at least one of the nuclei;

defining a plurality of radially-oriented rays associated with the nucleus, wherein some of the image data are associated with the rays; and performing calculations on the image data that are associated with the rays.

2. The method defined in claim 1 wherein the cells are labeled with fluorescent markers that fluoresce at different wavelengths, the method further comprising acquiring the image data with a scanning laser microscope.

3. The method defined in claim 1 further comprising defining the rays associated with the nucleus to have origins at a common location within the nucleus.

4. The method defined in claim 1 wherein the nucleus has a boundary, the method further comprising defining the rays associated with nucleus so that they have origins at the boundary of the nucleus.

5. The method defined in claim 1 further comprising providing a user with an opportunity to specify ray termination criteria.

6. The method defined in claim 1 wherein the lengths of the rays are determined by a user-defined length.

7. The method defined in claim 1 wherein the rays are further defined such that each ray that intersects the nucleus of another cell is terminated at the point of intersection.

8. The method in claim 1 wherein the rays are further defined such that each of the rays extends outward from the nucleus until terminated when the image data associated with that ray has an intensity level that drops below a given intensity level threshold.

9. The method defined in claim 1, wherein:
the image data include data for multiple channels, each of which is associated with a different wavelength of light;
analyzing the image data to identify the nucleus comprises analyzing the image data for one of the channels to identify the nucleus; and
performing calculations on the image data that are associated with the rays comprises performing calculations on the image data for at least one of the other channels.

10. The method defined in claim 1 wherein performing calculations on the image data that are associated with the rays comprises calculating for each ray the peak intensity of the image data along that ray.

11. The method defined in claim 1 wherein the image data include a plurality of pixels each having an associated pixel intensity level, and wherein performing calculations includes identifying the location of the pixel for each ray that has a peak intensity level for that ray.

12. The method defined in claim 1 wherein the cell has a cell boundary, the method further comprising identifying a seed point within the nucleus, wherein the rays extend from the seed point toward the cell boundary.

13. The method defined in claim 1 wherein performing calculations on the image data that are associated with the rays comprises performing statistical calculations.

14. The method defined in claim 1 wherein there is a peak intensity value for the image data at a particular location along each ray and wherein performing calculations on the image data that are associated with the rays comprises calculating a standard deviation based at least on the locations of the peak intensity values.

15. The method defined in claim 1 wherein the rays are at equally-spaced angles with respect to each other.

16. The method defined in claim 1 wherein the nucleus has a boundary and the rays are defined to originate at an origin within the nucleus and radiate outward in directions such that the rays pass through at least one pixel located at the nuclear boundary.

17. The method defined in claim 1 wherein the image data include a plurality of pixels and wherein the nucleus has a boundary and each ray originates at a pixel at the nuclear boundary and extends away from the nucleus in a direction such that all rays for a given nucleus project back to a common point within the nucleus.

18. The method defined in claim 1 wherein:
the image data include data for multiple channels, each of which is associated with a different wavelength of light; and
performing calculations on the image data that are associated with the rays comprises performing calculations on the image data for one of the channels and using the results of the calculations on the image data for that channel to perform calculations on the image data in another of the channels.

19. The method defined in claim 1 wherein:
the image data include data for multiple channels, each of which is associated with a different wavelength of light; and
performing calculations on the image data that are associated with the rays comprises performing calculations on the image data for one of the channels to identify peak intensity locations along the rays and performing calculations on the image data for another of the channels at the identified peak intensity locations.

20. The method defined in claim 1 wherein:
the image data include data for multiple channels, each of which is associated with a different wavelength of light; and
performing calculations on the image data that are associated with the rays comprises:
performing calculations on the image data for one of the channels to identify peak intensity locations along the rays; and
performing calculations on the image data for at least one other one of the channels at the identified peak intensity locations to determine a ratio of intensities at the identified peak intensity locations to ray origin pixel intensities.

21. The method defined in claim 1, wherein performing calculations on the image data that are associated with the rays comprises:
performing calculations on the image data associated with the rays to identify a peak intensity location along each ray; and
determining a ratio of the intensity at the identified peak intensity location of each ray to a ray origin pixel intensity for that ray.

22. The method defined in claim 1 wherein:
the image data include data for multiple channels, each of which is associated with a different wavelength of light; and
performing calculations on the image data that are associated with the rays comprises:
performing calculations on the image data for one of the channels to identify peak intensity locations along the rays; and
performing calculations on the image data for another of the channels at the identified peak intensity locations to determine a ratio of intensities at the identified peak intensity locations to average ray pixel intensities.

23. The method defined in claim 1, wherein performing calculations on the image data that are associated with the rays comprises:
performing calculations on the image data associated with the rays to identify the peak intensity locations along the ray; and
determining a ratio of intensities at the identified peak intensity locations to average ray pixel intensities.

24. The method defined in claim 1 wherein performing calculations on the image data that are associated with the rays comprises:
performing calculations on the image data that are associated with the rays for the specimen prior to activation with a chemical or biological entity;
performing calculations on the image data that are associated with the rays for the same sample following activation with that chemical or biological entity; and
calculating which changes in the image data are due to the activation of the specimen with the chemical or biological entity.

25. The method defined in claim 1 wherein performing calculations on the image data that are associated with the rays comprises:
determining which of the rays associated with the nucleus are valid, where each valid ray contains more than a user-specified number of pixels between its origin and a termination point; and
performing calculations on the image data that are associated with the rays for nuclei that have more than a user-specified number of valid rays.

26. The method defined in claim 1, wherein the rays each have a ray origin at one end and an outer end at the other end, wherein performing calculations on the image data that are associated with the rays comprises calculating a normalized radius parameter having a value that ranges from 0 to 1 by determining an average intensity-weighted distribution for pixels associated with the rays, such that when the intensity-weighted distribution of the pixels is weighted more toward the ray origins than the outer ends of the rays, the value of the normalized radius parameter is nearer to 0 than to 1 and when the intensity-weighted distribution of the pixels is weighted more toward the outer ends of the rays than the ray origins, the value of the normalized radius parameter is nearer to 1 than to 0.

27. A method for analyzing digital image data for a specimen that contain cells, wherein the cells contain nuclei and the image data include data for multiple channels, each of which is associated with a different wavelength of light, wherein there are a plurality of radially-oriented rays associated with each of the nuclei, and wherein some of the image data are associated with the rays, the method comprising:
analyzing the image data in a first of the channels to identify a plurality of the nuclei;
calculating the intensity of a plurality of pixels associated with each of the identified nuclei in a second of the channels; and
performing calculations on the image data associated with the rays for those cells in which the intensity of pixels associated with the nuclei in the second channel is greater than or less than a user-defined threshold value.

28. A method for analyzing digital image data for a specimen that contain cells, wherein the cells contain nuclei and the image data include data for multiple channels, each of which is associated with a different wavelength of light, wherein there are a plurality of radially-oriented rays associated with each of the nuclei, and wherein some of the image data are associated with the rays, the method comprising:
analyzing the image data in a first one of the channels to identify at least a given one of the nuclei;
calculating the intensity of a plurality of pixels associated with that given nucleus in a second one of the data channels; and
normalizing results of calculations performed on the image data associated with the rays in a third one of the channels using results of the calculations of the pixel intensities in the second channel.

29. A system comprising:
image acquisition equipment for acquiring digital image data for a specimen that contains cells, wherein the cells contain nuclei; and
a processor configured to:
analyze the image to identify at least one of the nuclei;
define a plurality of radially-oriented rays associated with the nucleus, wherein some of the image data is associated with the rays; and
perform calculations on the image data that is associated with the rays.

30. The system defined in claim 29 wherein the cells are labeled with fluorescent markers that fluoresce at different wavelengths and wherein the image acquisition system comprises a multi-wavelength scanning laser microscope.

31. The system defined in claim 29 wherein the processor is further configured to ensure that the rays do not encroach on other nuclei.

32. The system defined in claim 29 wherein the image data includes data for multiple channels, each of which is associated with a different wavelength of light, and wherein the processor is further configured to:
analyze the image data for one of the channels to identify the nucleus; and
perform calculations on the image data for another one of the channels.

33. The system defined in claim 29 wherein the image data includes data for multiple channels, each of which is associated with a different wavelength of light, and wherein the processor is further configured to:
analyze the image data for one of the channels to identify the nucleus; and
perform calculations on the image data for another of the channels including calculations on pixel intensity image data associated with the rays.

* * * * *